United States Patent
Lin et al.

(10) Patent No.: US 11,893,054 B2
(45) Date of Patent: Feb. 6, 2024

(54) MULTIMEDIA INFORMATION PROCESSING METHOD, APPARATUS, ELECTRONIC DEVICE, AND MEDIUM

(71) Applicant: Beijing Bytedance Network Technology Co., Ltd., Beijing (CN)

(72) Inventors: Zhaoqin Lin, Beijing (CN); Wei Jiang, Beijing (CN); Qifan Zheng, Beijing (CN); Chen Shen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/734,977

(22) Filed: May 2, 2022

(65) Prior Publication Data

US 2022/0269714 A1    Aug. 25, 2022

Related U.S. Application Data

(63) Continuation of application No. PCT/CN2020/127206, filed on Nov. 6, 2020.

(30) Foreign Application Priority Data

Nov. 8, 2019   (CN) .......................... 201911088949.0

(51) Int. Cl.
*G06F 16/483*   (2019.01)
*G06V 20/40*   (2022.01)
(Continued)

(52) U.S. Cl.
CPC .......... *G06F 16/483* (2019.01); *G06T 1/0007* (2013.01); *G06V 20/40* (2022.01)

(58) Field of Classification Search
CPC ..... G06F 16/483; G06V 20/40; G06T 1/0007; H04N 9/80; H04N 5/76; H04N 5/783
(Continued)

(56) References Cited

U.S. PATENT DOCUMENTS 9,747,057 B1 *   8/2017   Ramani ................... G06F 3/067
10,037,129 B2 *   7/2018   Lewis ................. G06F 3/04842
(Continued)

FOREIGN PATENT DOCUMENTS

CN   104853081 A   8/2015
CN   109089127 A   12/2018
(Continued)

OTHER PUBLICATIONS

International Search Report issued in corresponding International Application No. PCT/CN2020/127206 dated Feb. 5, 2021.
(Continued)

*Primary Examiner* — Daquan Zhao
(74) *Attorney, Agent, or Firm* — ARENTFOX SCHIFF LLP

(57) ABSTRACT

A multimedia information processing method, apparatus, electronic device, and medium are provided. The method includes: receiving a user's selection operation for any piece of multimedia information among multimedia information to be processed, the multimedia information to be processed comprising at least two pieces of multimedia information, any piece of multimedia information being any piece of multimedia information except the last piece; determining a target multimedia information piece on the basis of a selected operation; upon receiving a trigger operation for the target multimedia information piece, determining a corresponding processing method; on the basis of the determined processing method, correspondingly processing the target multimedia information piece. Thus, the complexity of processing multimedia information is reduced and efficiency is improved, thereby improving user experience.

18 Claims, 7 Drawing Sheets

(51) Int. Cl.
*G06T 1/00* (2006.01)
*H04N 9/80* (2006.01)
*H04N 5/76* (2006.01)

(58) Field of Classification Search
USPC ............... 386/239, 343, 345, 350, 314, 278
See application file for complete search history.

(56) References Cited

U.S. PATENT DOCUMENTS

| | | | |
|---|---|---|---|
| 2001/0040592 A1* | 11/2001 | Foreman | G11B 27/34 375/E7.189 |
| 2015/0067514 A1 | 3/2015 | Lewis et al. | |
| 2015/0181301 A1* | 6/2015 | Bloch | H04N 21/4532 725/41 |
| 2015/0302889 A1 | 10/2015 | Chung et al. | |
| 2019/0182494 A1 | 6/2019 | Li | |
| 2019/0188483 A1 | 6/2019 | Taylor et al. | |
| 2020/0411053 A1 | 12/2020 | Han et al. | |

FOREIGN PATENT DOCUMENTS

| | | |
|---|---|---|
| CN | 109151595 A | 1/2019 |
| CN | 109446346 A | 3/2019 |
| CN | 109600628 A | 4/2019 |
| CN | 110225278 A | 9/2019 |
| CN | 110798744 A | 2/2020 |
| JP | 2016504790 A | 2/2016 |
| WO | 2019129433 A1 | 7/2019 |

OTHER PUBLICATIONS

European Search Report issued in corresponding European Application No. EP 20 88 4824 dated Dec. 1, 2022.
First Examination Report issued issued in corresponding Indian Application No. 202227028897 dated Sep. 22, 2022.
Office Action in JP2022526140, dated Jun. 6, 2023, 7 pages.

* cited by examiner

MULTIMEDIA INFORMATION PROCESSING METHOD, APPARATUS, ELECTRONIC DEVICE, AND MEDIUM

CROSS REFERENCE OF RELATED APPLICATION

This application is a continuation of International Application No. PCT/CN2020/127206, filed on Nov. 6, 2020, which claims priority to Chinese Patent Application No. 201911088949.0, filed on Nov. 8, 2019 with the China National Intellectual Property Administration, both of which are incorporated herein by reference in their entireties.

FIELD

The present disclosure relates to the field of multimedia technology, and in particular to a method and an apparatus for processing multimedia information, an electronic device and a medium.

BACKGROUND

With the continuous development of Internet technology and computer multimedia technology, multimedia information becomes an important part of entertainment for users. A user may acquire multimedia information from network or by using a camera. The multimedia information is processed to meet needs of the user. Therefore, multimedia information processing technology becomes more and more important.

When at least two segments of multimedia information are acquired and need to be processed, only the last segment of multimedia information can be directly processed. The rest segments, except the last segment, need to be processed according to a reverse order in which the segments are acquired. For example, if a video captured by a user includes multiple video segments (which are captured in a sequence of segment A, segment B and segment C), the penultimate video segment (segment B) can be deleted only after the last video segment (segment C) is deleted, which results in high complexity and low efficiency in processing multimedia information, and poor user experience.

SUMMARY

A method and an apparatus for processing multimedia information, an electronic device and a medium are provided in the present disclosure, which can solve at least one of the above-mentioned technical problems.

In a first aspect, a method for processing multimedia information is provided. The method includes:

receiving, from a user, a selection operation on an arbitrary multimedia segment in to-be-processed multimedia information, where the to-be-processed multimedia information includes at least two multimedia segments, and the arbitrary multimedia segment is not a last multimedia segment among the at least two multimedia segments;

determining a target multimedia segment, based on the selection operation;

determining a processing triode, when a trigger operation on the target multimedia segment is received; and processing the target multimedia segment, based on the determined processing mode.

In a second aspect, an apparatus for processing multimedia information is provided. The apparatus includes a receiving module, a first determining module, a second determining module, and a processing module.

The receiving module is configured to receive, from a user, a selection operation on one multimedia segment in to-be-processed multimedia information, where the to-be-processed multimedia information includes at least two multimedia segments, and the one multimedia segment is not a last multimedia segment among the at least two multimedia segments.

The first determining module is configured to determine a target multimedia segment, based on the selection operation.

The second determining module is configured to determine a processing mode, when a trigger operation on the target multimedia segment is received.

The processing module is configured to process the target multimedia segment, based on the determined processing mode.

In a third aspect, an electronic device is provided. The electronic device includes: at least one processor; a memory. One or more application programs stored in the memory. The application programs are executable by the processor for performing the method for processing multimedia information according to the first aspect.

In a fourth aspect, a computer-readable medium having a computer program stored thereon is provided. The computer program, when executed by a processor, causes the method for processing multimedia information according to the first aspect to be performed.

Advantageous effects of the technical solution in the present disclosure are described below.

A method and an apparatus for processing multimedia information, an electronic device and a medium are provided in the present disclosure. Compared with the conventional technology, the solution according to the present disclosure realizes a direct processing on arbitrary multimedia segment of the to-be-processed multimedia information based on a trigger operation on the arbitrary multimedia segment, which does not require to process various multimedia segments in the to-be-processed multimedia information in a reverse order of the multimedia segments in the to-be-processed multimedia information, thereby reducing complexity, improving efficiency in multimedia information processing, and improving user experience.

BRIEF DESCRIPTION OF THE DRAWINGS

In order to illustrate technical solutions in the embodiments of the present disclosure more clearly, the following briefly introduces accompanying drawings that are required to be used in the description of the embodiments of the present disclosure.

DETAILED DESCRIPTION

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and variants thereof as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first", "second", and the like, mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information exchanged between multiple apparatus in the embodiments of the present disclosure are only illustrative, and are not intended to limit the scope of the messages or information.

The technical solutions of the present disclosure and how the technical solutions of the present disclosure solve the above-mentioned technical problems are described in detail below with specific embodiments. The following specific embodiments may be combined with each other, and the same or similar concepts or processes may not be repeated in some embodiments. The embodiments of the present disclosure are described below with reference to the accompanying drawings.

Figure 1:
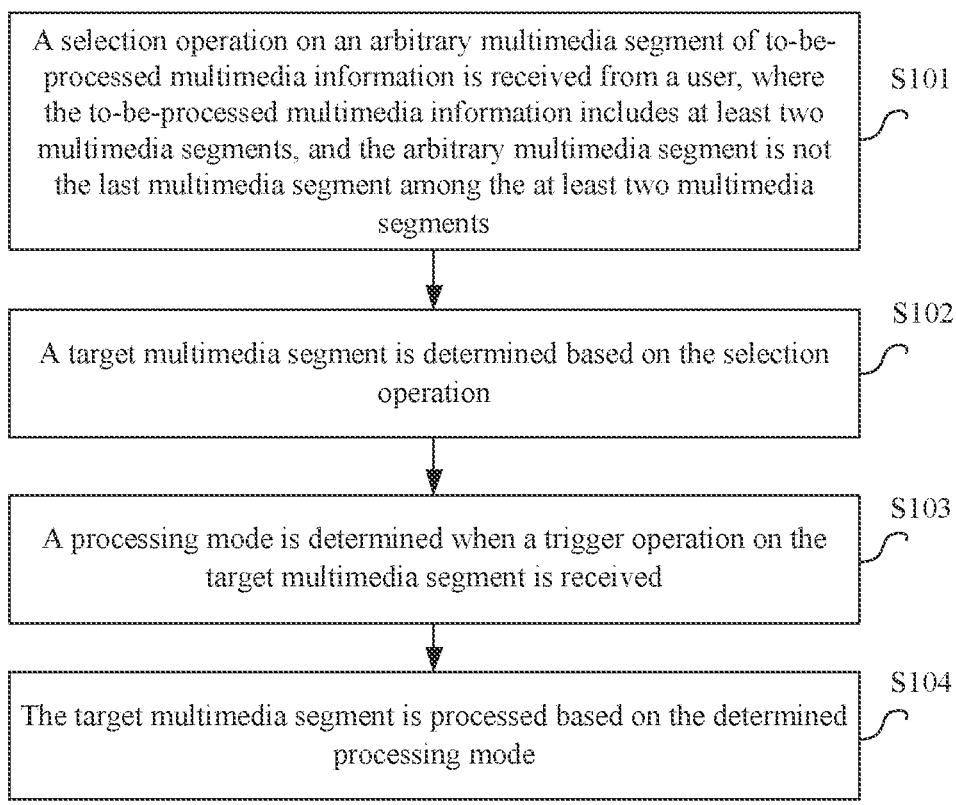
FIG. 1 is a schematic flowchart of a method for processing multimedia information according to an embodiment of the present disclosure.

According to an embodiment of the present disclosure, a method for processing multimedia information is provided. The method may be performed by a terminal device. As shown in FIG. 1, the method includes steps S101 to S104.

In step S101, a selection operation on an arbitrary multi media segment of to-be-processed multimedia information is received from a user.

The to-be-processed multimedia information includes at least two multimedia segments, and the arbitrary multimedia segment is not the last multimedia segment among the at least two multimedia segments.

For embodiments of the present disclosure, the selection operation for selecting an arbitrary multimedia segment of to-be-processed multimedia information includes any one of a click operation of the user on the arbitrary multimedia segment of to-be-processed multimedia information, or a long-press operation of the user on the arbitrary multimedia segment of to-be-processed multimedia information. Any other operations that can select the arbitrary multimedia segment of the to-be-processed multimedia information also fall within the protection scope of the embodiments of the present disclosure. The to-be-processed multimedia information includes at least one of video information, audio information, image information, or text information.

For an embodiment of the present disclosure, before step S101, the method may further include: capturing the at least two multimedia segments to obtain the to-be-processed multimedia information.

Figure 4A:
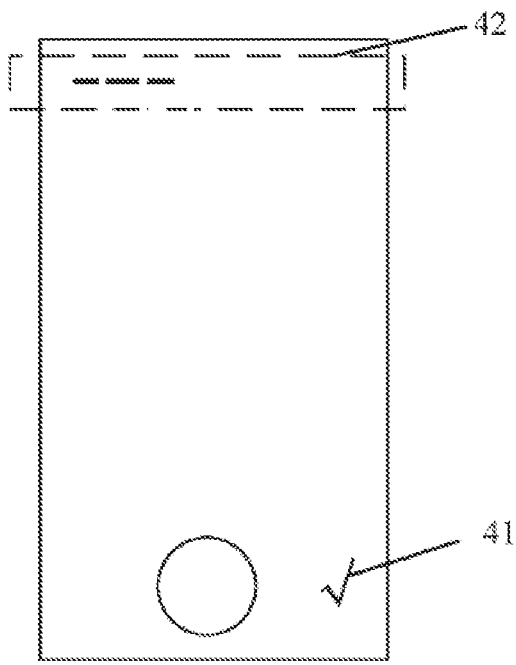
FIG. 4A is a schematic diagram of a capturing page for multimedia information according to an embodiment of the present disclosure.
Figure 4B:
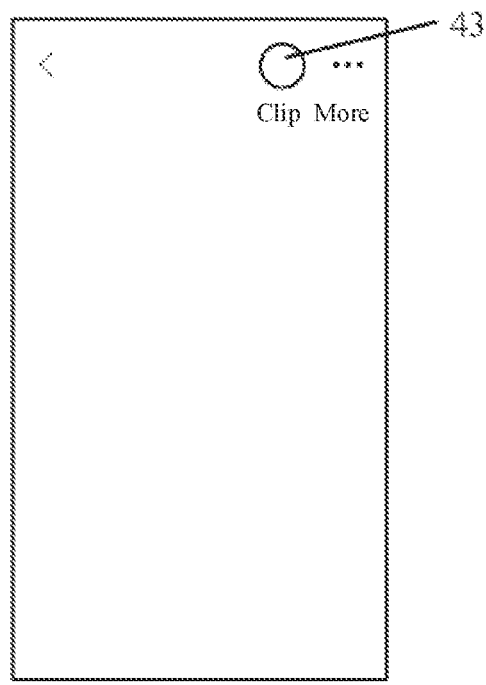
FIG. 4B is a schematic diagram of an editing page for multimedia information according to an embodiment of the present disclosure.
Figure 5:
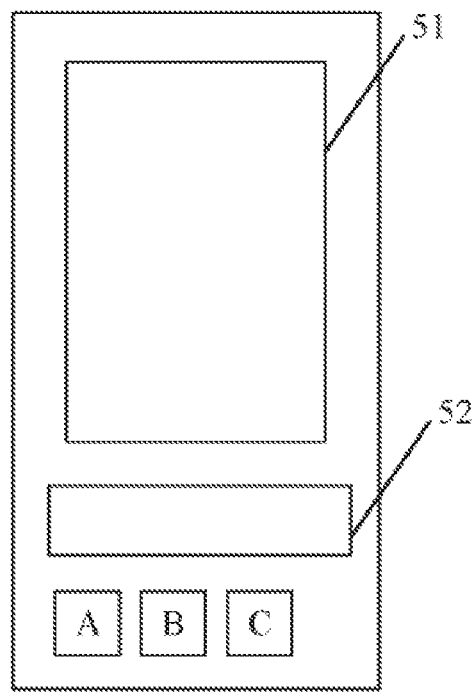
FIG. 5 is a schematic diagram of a video clipping detail page for multimedia information according to an embodiment of the present disclosure.

For example, the user may capture the multimedia segments through a capturing page as shown in FIG. 4A, In FIG. 4A, an area 42 indicates that the user has captured three video segments. An editing page, as shown in FIG. 4B, is generated and displayed when it is detected that the user triggers a "Finish" control 41. A video clipping detail page, as shown in FIG. 5, is generated and displayed when it is detected that the user triggers a "Clip" control 43. In FIG. 5, an area 51 represents a video playback area for the to-be-processed multimedia information, which is used to preview the to-be-processed multimedia information. An area 52 represents a display area for frame images of a video in the to-be-processed multimedia information. A, B and C represent three videos captured by the user, i.e., multimedia segment A, multimedia segment B and multimedia segment C, respectively. That is, the captured to-be-processed multimedia information includes multimedia segment A, multimedia segment B and multimedia segment C.

For an embodiment of the present disclosure, a selection operation of the user on any one of multimedia segments in the captured to-be-processed multimedia information is received. For example, following the mentioned example, the selection operation on the multimedia segment B is received from the user.

In step S102, a target multimedia segment is determined based on the selection operation.

Following the mentioned example, the multimedia segment B is determined as the target multimedia segment, based on a click operation of the user on the multimedia segment B.

In step S103, a processing mode is determined when a trigger operation on the target multimedia segment is received.

For an embodiment of the present disclosure, when the trigger operation on the target multimedia segment is received, an operation page corresponding to the target multimedia segment is displayed and a processing mode is determined based on a trigger operation of the user on the operation page corresponding to the target multimedia segment.

Figure 6:
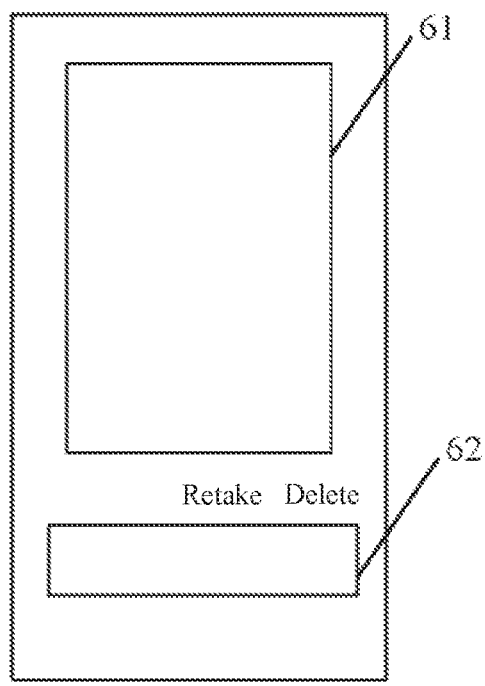
FIG. 6 is a schematic diagram of a single segment detail page for multimedia information according to an embodiment of the present disclosure.

For example, referring to FIG. 5, when a trigger operation on multimedia segment B is received, the multimedia segment B is determined as the target multimedia segment. A single segment detail page corresponding to the target multimedia segment is displayed, as shown in FIG. 6. In FIG. 6, an area 61 represents a video playback area for the target multimedia segment, which is used to preview the target multimedia segment. An area 62 represents a display area for frame images of a video in the target multimedia segment. In an embodiment of the present disclosure, the processing mode is determined to be a re-capturing processing, when it is received that the user triggers a "retake" control on the single segment detail page corresponding to the target multimedia segment. The processing mode is determined to be a deletion processing, when it is received that the user triggers a "Delete" control on the single segment detail page corresponding to the target multimedia segment.

In step S104, the target multimedia segment is processed based on the determined processing mode.

For an embodiment of the present disclosure, a process of processing the target multimedia segment based on the determined processing mode includes: processing at least one of video information, audio information, image information or text information included in the target multimedia segment. A detail process will be described in the following embodiments, which will not be repeated herein.

A method for processing multimedia information is provided according to the embodiments of the present disclosure. Compared with the conventional technology, the embodiments of the present disclosure realize a direct processing on any multimedia segment of the to-be-processed multimedia information based on a trigger operation on the any one multimedia segment, which does not require to process various multimedia segments in the to-be-processed multimedia information in a reverse order of the multimedia segments in the to-be-processed multimedia information, thereby reducing complexity, improving efficiency in multimedia information processing, and improving user experience. The above describes relevant contents of the method for processing multimedia information according to embodiments of the present disclosure. Relevant content of step S101 is described in detail below.

In another possible implementation of the present disclosure, before step S101, the method may further include: displaying identification information corresponding to respective multimedia segments in the to-be-processed multimedia information.

Step S101 may specifically include: receiving, from a user, a selection operation on the identification information corresponding to the arbitrary multimedia segment.

For an embodiment of the present disclosure, the identification information corresponding to the arbitrary multimedia segment may be a frame of image determined from the arbitrary multimedia segment. For example, in FIG. 5, a first frame from the multimedia segment A may be determined as the identification information corresponding to multimedia segment A, a first frame from the multimedia segment B may be determined as the identification information corresponding to multimedia segment B, and a first frame from the multimedia segment C may be determined as the identification information corresponding to multimedia segment C. In an embodiment of the present disclosure, a selection operation of the user on the identification information corresponding to any one of the multimedia segment A, the multimedia segment B, and the multimedia segment C may be received.

The relevant content of step S101 is described above in detail. The steps S102, S103 and S104 may be performed. In step S104, the determined processing mode may include at least one of a deletion processing, an insertion processing, a clipping processing, an addition processing of a special effect, a change processing of a filter, or a re-capturing processing. The processing modes are explained hereinafter.

In an implementation of the present disclosure, if the determined processing mode is a deletion processing, step S104 may specifically include: deleting the target multimedia segment to obtain multimedia information after the deletion processing.

For example, in FIG. 6, when a trigger operation on a "Delete" control on the single segment detail page corresponding to the target multimedia segment is received, the processing mode is determined to be the deletion processing, and the target multimedia segment is deleted. Specifically, the process of deleting the target multimedia segment may include: deleting at least one of video information, audio information, image information or text information in the target multimedia segment.

For an embodiment of the present disclosure, the process of deleting the target multimedia segment may include: deleting data corresponding to the target multimedia segment and stored in a first storage area, or moving the data corresponding to the target multimedia segment from the first storage area to a second storage area. The first storage area stores the target multimedia segment before the deletion processing.

When the multimedia information after the target multimedia segment is deleted is played, a start time of a segment following the deleted target multimedia segment may be adjusted. For example, after the multimedia segment B is deleted from the to-be-processed multimedia information (including segment A, segment B and segment C), when the multimedia information corresponding to the deleted segment B is played, the segment C may be played immediately after the segment A. It is not necessary to adjust the start time of a segment following the deleted target multimedia segment. For example, after the multimedia segment B is deleted from the to-be-processed multimedia information (including segment A, segment B and segment C), when the multimedia information corresponding to the deleted segment B is played, the segment C may be played at a time interval equal to a playback time (for example, after 5 seconds) of the segment B after the segment A is finished to be played.

Further, after deleting the target multimedia segment, the method may further include any one of step D1 and step D2.

In step D1, at least one multimedia segment is captured, at least one multimedia segment is selected from the captured multimedia segment, and the selected multimedia segment is inserted into the multimedia information after the deletion processing.

A position of the inserted multimedia segment with respect to multimedia segment in the multimedia information after the deletion processing is the same as a position of a deleted multimedia segment with respect to multimedia segment in the multimedia information after the deletion processing.

For an embodiment of the present disclosure, the captured multimedia segment may have a duration greater than, equal to or less than the duration of the deleted target multimedia segment. The at least one multimedia segment selected from the captured multimedia segment may have a duration greater than, equal to, or less than the duration of the deleted target multimedia segment, which are not limited herein. In an embodiment of the present disclosure, in the multimedia information after the deletion processing and the addition processing, a start time of each multimedia segment following the deleted multimedia segment may be adjusted.

For example, it is assumed that the multimedia segment B has a duration of 5 seconds. After the multimedia segment B is deleted, the multimedia information after the deletion processing is obtained, which includes the multimedia segment A and the multimedia segment C. It is further assumed that a captured multimedia segment B1 has a duration of 3 seconds, a captured multimedia segment B2 has a duration of 5 seconds, and a captured multimedia segment B3 has a duration of 8 seconds. Based on a selection operation of the user for the multimedia segment B1, the multimedia segment B2 and the multimedia segment B3, the multimedia segment B1 and the multimedia segment B3 are selected and inserted into the multimedia information after the deletion processing. That is, multimedia information after the deletion, capturing, selection and insertion processing includes the multimedia segment A, the multimedia segment B1, the multimedia segment B3 and the multimedia segment C. A total duration of the multimedia segment B1 and the multimedia segment B3 is 11 seconds, which is greater than the duration (5 seconds) of the deleted multimedia segment B. The start time of the multimedia segment C may be adjusted, that is, the start time of the multimedia segment C may be delayed by 6 seconds.

In step D2, the deleted target multimedia segment is restored to obtain multimedia information before the deletion processing.

In an embodiment of the present disclosure, when a restoring processing is determined to be performed based on a trigger operation of the user, data corresponding to the deleted target multimedia segment in a second storage area is moved to the first storage area, so as to restore the deleted multimedia segment. The first storage area stores the target multimedia segment before the deletion processing. In an embodiment of the present disclosure, after the deleted target multimedia segment is restored, the to-be-processed multimedia information before the deletion processing may be obtained.

For example, after the target multimedia segment (segment B) is deleted from the to-be-processed multimedia information (including segment A, segment B, and segment C) through a deletion operation, content of the target multimedia segment may be restored through a restoring operation, so as to obtain the multimedia information before the deletion processing (including segment A, segment B, and segment C).

In another implementation of the present disclosure, if the determined processing mode is the insertion processing, step S104 may specifically include: determining to-be-inserted multimedia information and an insertion position relative to the target multimedia segment; and inserting the to-be-inserted multimedia information at the determined insertion position relative to the target multimedia segment.

In an embodiment of the present disclosure, the to-be-inserted multimedia information is determined based on a selection operation from the user. The to-be-inserted multimedia information may be a part of multimedia segments in the to-be-processed multimedia information. The to-be-inserted multimedia information includes at least one multimedia segment, a part of the arbitrary multimedia segment, or a combination thereof. The determined to-be-inserted multimedia information may be multimedia information stored locally. The multimedia information stored locally may be multimedia information captured previously, or multimedia information downloaded from a network, which is not limited herein.

For example, the to-be-inserted multimedia information may be the multimedia segment B, a part of the multimedia segment B, or a combination of a part of the multimedia segment A, the multimedia segment B, and a part of the multimedia segment C.

In an embodiment of the present disclosure, after the target multimedia segment is determined, the processing mode is determined to be an insertion processing, based on a trigger operation of the user. That is, an insertion is to be performed on the target multimedia segment. In this case, a selection area including one or more insertion positions relative to the target multimedia segment may be displayed, to select an insertion position by the user. Based on a selection operation of the user on at least one of the insertion positions, the insertion position relative to the target multimedia segment is determined, and the determined to-be-inserted multimedia information is inserted at the determined insertion position relative to the target multimedia segment.

For example, when the user performs a touch control on an insertion operation area on a detail page for the target multimedia segment, information on an area for selecting the insertion position (indicating to an insertion before the multimedia segment, or an insertion after the multimedia segment) is displayed. When it is detected that the user triggers the area for selecting the insertion position (when it is detected that the user triggers "the insertion before the multimedia segment"), the to-be-inserted multimedia information is inserted at a position before the target multimedia segment.

In an embodiment of the present disclosure, after the multimedia information is inserted, a start time of the inserted multimedia segment and a start time of each multimedia segment after the insertion position may be adjusted. For example, for multimedia information (including the segment A, the segment B, and the segment C), if the multimedia segment B is determined as the target multimedia segment and the user selects a multimedia segment B0 as the to-be-inserted multimedia information, the multimedia information B0 is inserted a position before the multimedia segment B. It is necessary to adjust the start time of the multimedia segment B0, the start time of the multimedia segment B, and the start time of the multimedia segment C.

In another possible implementation of the present disclosure, if the determined processing mode is the clipping processing, step S104 may specifically include: determining to-be-clipped multimedia information from the target multimedia segment; and clipping off the determined to-be-clipped multimedia information.

In an embodiment of the present disclosure, a selection operation is detected to select at least one frame from the target multimedia segment by the user; and the selected at least one frame is determined as the to-be-clipped multimedia information. Alternatively, the user selects a multimedia segment with a preset duration from the target multimedia segment, and determines the selected multimedia segment with the preset duration as the to-be-clipped multimedia information.

For example, when it is detected that consecutive 8 frames are selected by the user from the target multimedia segment, the consecutive 8 frames are determined as the to-be-clipped multimedia information. The consecutive 8 frames are then cut out from the target multimedia segment. For example, the target multimedia segment includes 15 frames. The clipped target multimedia segment has 7 frames after the consecutive 8 frames are cut out from the target multimedia segment. For another example, when it is detected that multimedia information lasting for consecutive 7 seconds is selected from the target multimedia segment, the selected multimedia information lasting for consecutive 7 seconds is determined as the to-be-clipped multimedia information, and is cut out. If the duration of the target multimedia segment is 11 seconds, the duration of the target multimedia segment is 4 seconds after the multimedia information lasting for consecutive 7 seconds is cut out.

In another possible implementation of the present disclosure, if the determined processing mode includes at least one of the addition processing of the special effect and the change processing of the filter, and the target multimedia segment includes at least one frame, step S104 may specifically include: determining at least one to-be-processed frame from the target multimedia segment; adding a special effect and/or changing a filter on the at least one to-be-processed frame.

In an embodiment of the present disclosure, the to-be-processed multimedia information determined from the target multimedia segment may be the entire target multimedia segment, at least one segment of the target multimedia segment, or some multimedia frames in the target multimedia segment, which will not be limited herein.

For example, when it is detected that 8 frames are selected by the user, a special effect such as a "starlight effect" may be added to each of the 8 frames. In addition, a filter applied on the 8 frames may be changed, for example, changed to an "embossment filter".

In another possible implementation of the present disclosure, if the determined processing mode is the re-capturing processing, step S104 may specifically include: re-capturing at least one multimedia segment for the target multimedia segment.

Figure 7A:
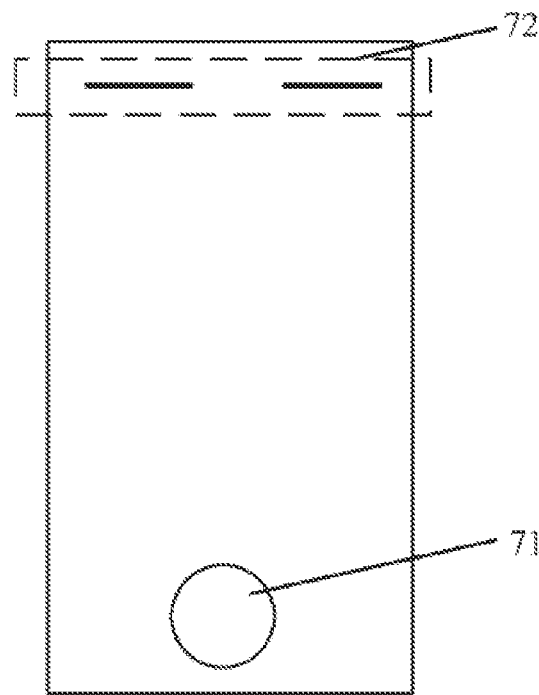
FIG. 7A is a schematic diagram of a re-capturing page for multimedia information according to an embodiment of the present disclosure.
Figure 7B:
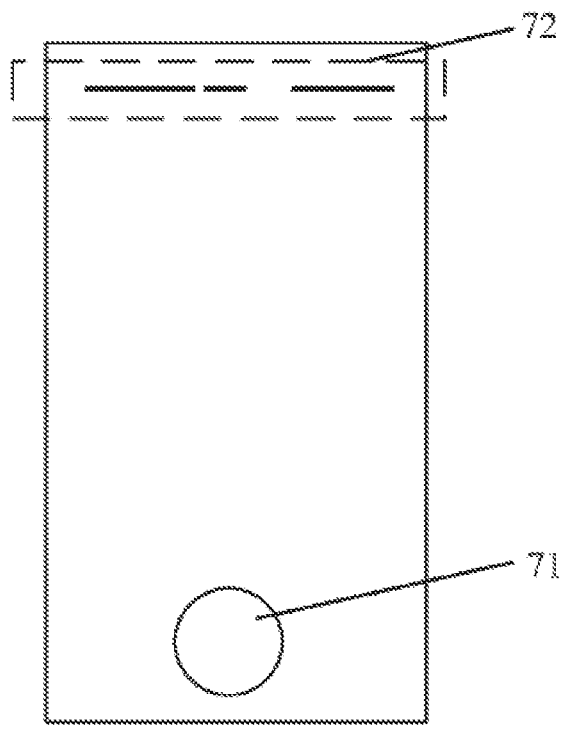
FIG. 7B is a schematic diagram of a re-capturing page for multimedia information according to another embodiment of the present disclosure.
Figure 7C:
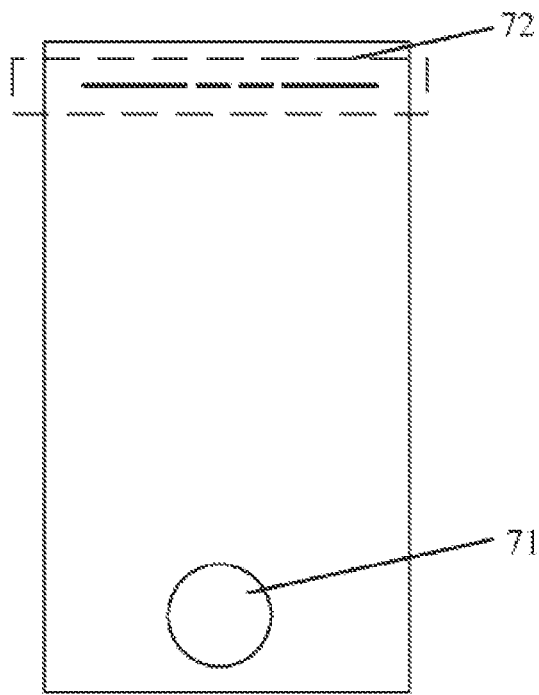
FIG. 7C is a schematic diagram of a re-capturing page for multimedia information according to yet another embodiment of the present disclosure.

An instance is provided according to an embodiment of the present disclosure. As shown in FIG. 6, the user may trigger a "retake" to start the re-capturing for the target multimedia segment. Specifically, when it is detected that the "retake" is triggered by the user, a capturing page as shown in FIG. 7A is generated and displayed. Specifically, in FIG. 7A, "———   ———" in an area 72 indicates that a middle segment of multimedia information (which is the target multimedia segment) is re-captured. The user may long press the control 71 to start re-capturing, and a multimedia segment is obtained when the long-press on the control 71 is stopped. Then, a capturing page as shown in FIG. 7B is displayed. Specifically, in FIG. 7B, "———   ———" in an area 72 indicates that a multimedia segment is captured for the middle segment of the multimedia information. When the user long presses the control 71 again, the re-capturing is started. When the user stops the long-press on the control 71, another multimedia segment is obtained and a capturing page as shown in FIG. 7C is displayed. Specifically, in FIG. 7C, "——————" in area 72 indicates that two multimedia segments are re-captured for the middle segment of the multimedia information.

In an embodiment of the present disclosure, after al least one multimedia segment is re-captured for the target multimedia segment, an operation interface for the at least one re-captured multimedia segment is displayed, and a processing is performed based on a trigger operation of the user on the operation interface for the at least one re-captured multimedia segment.

Figure 8:
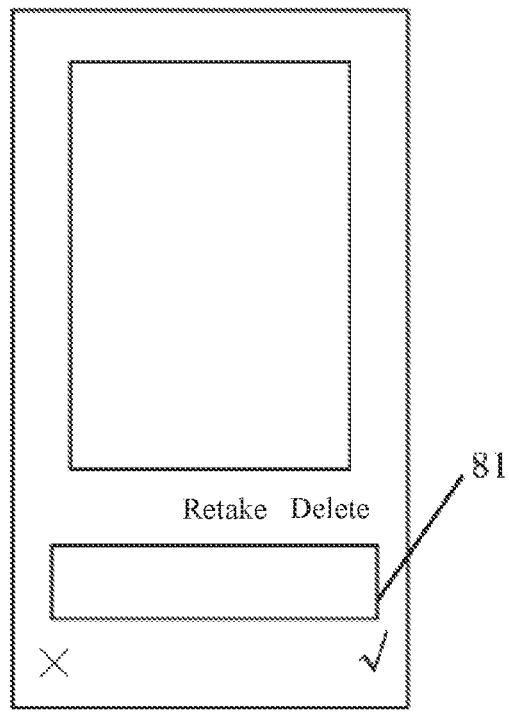
FIG. 8 is a schematic diagram of a re-captured single segment detail page for multimedia information according to an embodiment of the present disclosure.
Figure 9:
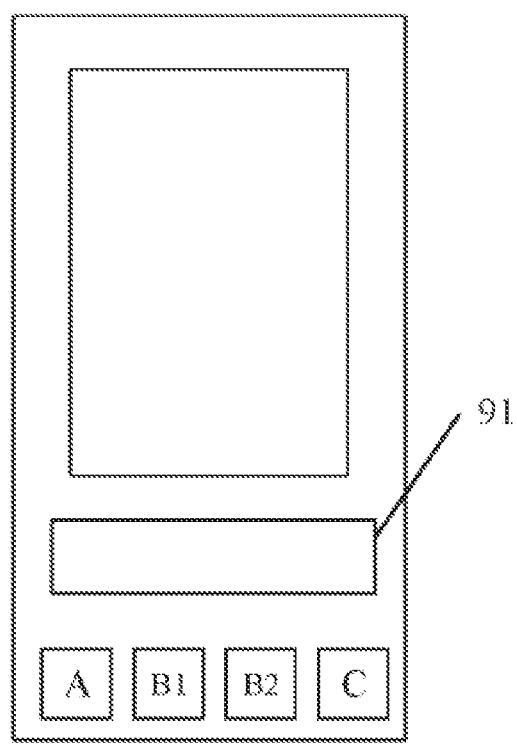
FIG. 9 is a schematic diagram of a re-captured video clipping detail page for multimedia information according to an embodiment of the present disclosure.

Further, when the re-capturing for the target multimedia segment completes, a re-captured single segment detail page as shown in FIG. 8 is displayed. An area 81 is a display area for frames of videos in the two re-captured multimedia segments. When "Retake" is triggered by the user, re-capturing is performed on the two recaptured multimedia segments. When "Delete" is triggered by the user, the two re-captured multimedia segments are deleted. When "X" is triggered by the user, the two re-captured multimedia segments are rejected and the re-captured single segment detail page is switched off. In this case, the single segment detail page as shown in FIG. 6 is displayed. When "√" is triggered by the user, the two re-captured multimedia segments are accepted and the re-captured single segment detail page is switched off In this case, a re-captured video clipping detail page as shown in FIG. 9 is displayed. In FIG. 9, an area 91 is a display area for frames of videos in re-captured multimedia information. The re-captured multimedia information includes the multimedia segment A, the multimedia segment B1, the multimedia segment B2, and the multimedia segment C.

In an embodiment of the present disclosure, a duration of a re-captured multimedia segment may be greater than, equal to, or less than the duration of the target multimedia segment, which is not limited herein. For example, the target multimedia segment is the multimedia segment B, and the duration of the multimedia segment B is 5 seconds. Three multimedia segments may be re-captured for the multimedia segment B, i.e., a multimedia segment B1, a multimedia segment B2, and a multimedia segment B3. The multimedia segment B1 has a duration of 3 seconds, the multimedia segment B2 has a duration of 5 seconds, and the multimedia segment B3 has a duration of 8 seconds.

Further, after re-capturing at least one multimedia segment for the target multimedia segment, the method may further include: determining, based on an selection operation of the user, at least one multimedia segments for replacing the target multimedia segment among the re-captured multimedia segments; and replacing the target multimedia segment with the at least one determined multimedia segment.

In an embodiment of the present disclosure, initial multimedia information includes M segments. When one of the M segments is re-captured and N segments are obtained, N1 segments are determined from the N segments based on a selection operation of the user for the N segments. The N1 segments are used to replace the target multimedia segment. After the target multimedia segment is replaced with the N1 segments, the multimedia information after re-capturing and replacing includes M+N1−1 segments in total. Based on a predetermined order of the M initial multimedia segments and an order of the N1 segments, the M+−N1−1 multimedia segments are spliced together to constitute complete multimedia information.

In an example, it is assumed that the initial multimedia information includes a multimedia segment A, a multimedia segment B, and a multimedia segment C. Three multimedia segments are re-captured for the segment B, a multimedia segment B1, a multimedia segment B2, and a multimedia segment B3. The multimedia segment B1 and multimedia segment B3 are selected by the user to replace the multimedia segment B. Therefore, there are 4 multimedia segments after re-capturing and replacing. The multimedia segment A, the multimedia segment B1, the multimedia segment B3 and the multimedia segment C are spliced together based on an order of the multimedia segment A, the multimedia segment B, and the multimedia segment C and an order of the multimedia segment B1 and the multimedia segment B3, so as to constitute complete multimedia information.

In an embodiment of the present disclosure, after replacing the target multimedia segment with the at least one determined multimedia segment, the duration of the multimedia information after the replacing may be different from the duration of the multimedia information before the replacing.

For example, if the duration of the initial multimedia information is 15 seconds, the duration of the multimedia segment B is 5 seconds, the duration of the multimedia segment B1 is 3 seconds, and the duration of the multimedia segment B3 is 8 seconds, then the duration of the multimedia information constituted by splicing these segments is equal to 15−5+3+8=21 seconds.

In an embodiment of the present disclosure, after replacing the target multimedia segment with the at least one determined multimedia segment, the method may further include: deleting data corresponding to the target multimedia segment that has been re-captured and replaced, or moving the data corresponding to the target multimedia segment that has been re-captured and replaced from a first storage area to a second storage area. The first storage area stores the target multimedia segment before the deletion processing and the re-capturing processing.

In step S104, the determined processing mode is not limited to the processing shown above, but may include other processing modes, which will not be limited in the embodiments of the present disclosure. For example, the determined processing mode may be an adjustment processing for a playback speed. That is, multimedia information with a preset duration is determined from the target multimedia segment and the playback speed of the determined multimedia information is adjusted to, for example, a double speed. For another example, the determined processing mode may include a position adjustment processing. That is, when a drag operation of the user for identification information corresponding to the target multimedia segment is determined, a final position of the drag operation is determined, and a position of the target multimedia segment in the to-be-processed multimedia information is adjusted based on the final position of the drag operation. A process of adjusting a position of the target multimedia segment in the to-be-processed multimedia information based on the final position of the drag operation may specifically include: determining an insertion position in the to-be-processed multimedia information based on the final position of the drag operation, and moving and inserting the target multimedia segment to the insertion position; or determining a to-be-exchanged multimedia segment from the to-be-processed multimedia information based on the final position of the drag operation, and exchanging positions of the target multimedia segment and the to-be-exchanged multimedia segment.

Detailed processing corresponding to each of various processing modes determined is described in detail above. After the deletion processing, one or more multimedia segments are captured or re-captured when a capturing processing or a re-capturing processing is performed on the target multimedia segment. Methods for capturing or re-capturing multimedia information are described in detail through the following embodiments.

In another possible implementation of the present disclosure, the method for processing multimedia information further includes at least one of step E1 and step E2.

In an embodiment of the present disclosure, step E1 and step E2 may be performed when at least one multimedia segment is captured, or may be performed when at least one multimedia segment is re-captured for the target multimedia segment, which is not limited herein.

In step E1, capturing or re-capturing is controlled to be stopped when it is detected that a duration of the captured or re-captured multimedia information reaches a duration of the target multimedia segment.

In an embodiment of the present disclosure, when it is detected that a duration of the captured or re-captured multimedia information reaches a duration of the target multimedia segment, the capturing or re-capturing may be controlled to be stopped. Furthermore, first prompt information may be generated and displayed. The first prompt information is used to prompt the user that the capturing or re-capturing has been stopped, so as to inform the user that the capturing or re-capturing is completed.

In an embodiment of the present disclosure, a second prompt is generated and displayed, when it is detected that the duration of the captured or re-captured multimedia information reaches a preset duration and is less than the duration of the target multimedia segment. The second prompt is used to prompt the user that the capturing or re-capturing is to be stopped, such that the user may adjust a capturing or re-capturing progress in time.

In step E2, capturing or re-capturing is controlled to be stopped when an operation for stopping the capturing or the re-capturing triggered by the user is detected.

In an embodiment of the present disclosure, capturing or re-capturing is controlled to be stopped when an operation for stopping the capturing or the re-capturing triggered by the user is detected. The duration of the captured or re-captured multimedia information may be greater than, equal to, to less than the duration of the target multimedia segment. When a trigger operation of the user for the captured or re-captured multimedia information is detected and the processing mode corresponding to the trigger operation is determined as the clipping processing, the clipping processing is performed on the captured or re-captured multimedia information. For example, multimedia information with a duration of 4.5 seconds is cut from the captured multimedia information with a duration of 9 seconds, details of which may be referred to relevant content of the above-mentioned embodiments, and are not repeated herein.

The above describes the processing performed on the target multimedia segment in detail. In addition, preset multimedia information may be processed. The preset multimedia information may be the to-be-processed multimedia information, or may be multimedia information obtained by processing the target multimedia segment in the to-be-processed multimedia information.

In another possible implementation of the present disclosure, the method for processing multimedia information may further include: determining to-be-clipped multimedia information from preset multimedia information; clipping out the determined to-be-clipped multimedia information from the preset multimedia information.

The preset multimedia information includes: the to-be-processed multimedia information and/or multimedia information obtained by processing the target multimedia segment in the to-be-processed multimedia information.

In an embodiment of the present disclosure, the determined to-be-clipped multimedia information may be one or more successive frames, or may be frames with a preset duration. A specific manner of performing clipping on the preset multimedia information is similar to that on the target multimedia segment, details of which is as shown above and will not be repeated herein.

Relevant content of a clipping process on the preset multimedia information is described. Other processing, such as a deletion processing, an insertion processing, an addition processing of a special effect, a change processing of a filter, or a re-capturing processing may also be performed on the preset multimedia information. A specific process of performing any of the deletion processing, the insertion processing, the addition processing of the special effect, the change processing of the filter, and the re-capturing processing is similar to that on the target multimedia segment, details of which is as shown above and will not be repeated herein.

The above describes the method for processing multimedia information from a perspective of method steps, and an apparatus for processing multimedia information is introduced below from a perspective of virtual modules or virtual units.

Figure 2:
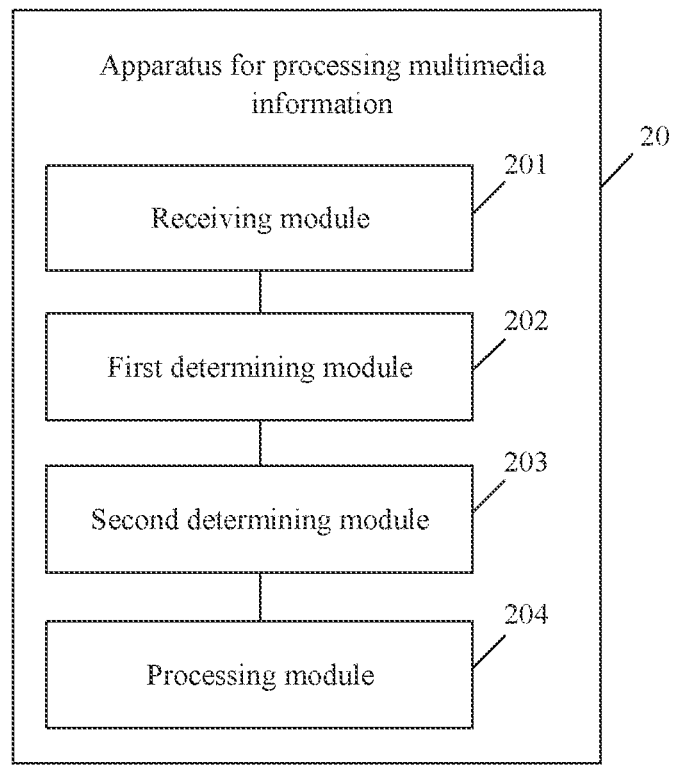
FIG. 2 is a schematic structural diagram of an apparatus for processing multimedia information according to an embodiment of the present disclosure.

An apparatus for processing multimedia information is provided according to an embodiment of the present disclosure. As shown in FIG. 2, the apparatus 20 for processing multimedia information may include: a receiving module 201, a first determining module 202, a second determining module 203, and a processing module 204.

The receiving module 201 is configured to receive, from a user, a selection operation on an arbitrary multimedia segment in to-be-processed multimedia information.

The to-be-processed multimedia information includes at least two multimedia segments, and the arbitrary multimedia segment is not the last multimedia segment among the at least two multimedia segments.

The first determining module 202 is configured to determine a target multimedia segment based on the selection operation.

The second determining module 203 is configured to determine a processing mode when a trigger operation on the target multimedia segment is received.

The processing module 204 is configured to process the target multimedia segment, based on the determined processing mode.

In another possible implementation of the present disclosure, the apparatus 20 for processing multimedia information may further include a display module.

The display module is configured to display identification information corresponding to respective multimedia segments in the to-be-processed multimedia information.

The receiving module 201 is configured to receive, from the user, a selection operation on identification information corresponding to the arbitrary multimedia segment.

In another possible implementation of the present disclosure, when the determined processing mode is a deletion processing, the processing module 204 includes a deletion unit.

The deletion unit is configured to delete the target multimedia segment, to obtain multimedia information after the deletion processing.

In another possible implementation of the present disclosure, the apparatus 20 for processing multimedia information may further include any one of a capturing-selecting-inserting module or a restoring module.

The capturing-selecting-inserting module is configured to capture one or more multimedia segments, select at least one multimedia segment from the captured multimedia segments, and inserting the selected multimedia segment into the multimedia information after the deletion processing.

A position of the inserted multimedia segment with respect to multimedia segments in the multimedia information after the deletion processing is the same as a position of a deleted multimedia segment with respect to the multimedia segments in the multimedia information after the deletion processing.

The restoring module is configured to restore the deleted target multimedia segment to obtain multimedia information before the deletion processing.

In another possible implementation of the present disclosure, when the determined processing mode is an insertion processing, the processing module 204 may include a first determining unit and an inserting unit.

The first determining unit is configured to determine to-be-inserted multimedia information and an insertion position relative to the target multimedia segment.

The inserting unit is configured to insert the to-be-inserted multimedia information at the determined insertion position relative to the target multimedia segment.

In another possible implementation of the present disclosure, when the determined processing mode is a clipping processing, the processing module 204 may include a second determining unit and a clipping unit.

The second determining unit is configured to determine to-be-clipped multimedia information from the target multimedia segment.

The clipping unit is configured to clip out the determined to-be-clipped multimedia information.

In another possible implementation of the present disclosure, when the determined processing mode includes at least one of an addition processing of a special effect and a change processing of a filter, and the target multimedia segment includes frames.

The processing module 204 may include a third determining unit and an adding-modifying unit.

The third determining unit is configured to determine at least one to-be-processed frame from the target multimedia segment.

The adding-modifying unit is configured to perform at least one of the addition processing of the special effect and the change processing of the filter on the at least one to-be-processed frame.

In another possible implementation of the present disclosure, when the determined processing mode is a re-capturing processing, the processing module 204 may include a re-capturing unit.

The re-capturing unit is configured to re-capture at least one multimedia segment for the target multimedia segment.

In another possible implementation of the present disclosure, the apparatus 20 for processing multimedia information may further include a third determining module and a replacement module.

The third determining module is configured to determine, from the re-captured multimedia segments, at least one multimedia segment for replacing the target multimedia segment, based on the selection operation from the user.

The replacement module is configured to replace the target multimedia segment with the at least one determined multimedia segment.

In another possible implementation of the present disclosure, the apparatus 20 for processing multimedia information may further include at least one of a first control stop module and a second control stop module.

The first control stop module is configured to control capturing or re-capturing to be stopped when it is detected that a duration of the captured or re-captured multimedia segment reaches the duration of the target multimedia segment.

The second terminating module is configured to control the capturing or re-capturing to be stopped when an operation for stopping the capturing or the re-capturing triggered by the user is detected.

In another possible implementation of the present disclosure, the apparatus 20 for processing multimedia information may further include a fourth determining module and a clipping module.

The fourth determining module is configured to determine to-be-clipped multimedia information from preset multimedia information.

The clipping module is configured to clip out the determined to-be-clipped multimedia information from the preset multimedia information.

The preset multimedia information includes at least one of the to-be-processed multimedia information, and multimedia information obtained by processing the target multimedia segment in the to-be-processed multimedia information.

In an embodiment of the present disclosure, the first determining module 201, the second determining module 202, the third determining module, and the fourth determining module may be the same or four different determining modules, or may be arbitrarily combined into the same determination module. The first control stop module and the second control stop module may be the same or two different control stop modules. The first determining unit, the second determining unit and the third determining unit may be the same or three different determining units, or two of the determining units may be the same, which are not limited herein.

The apparatus 20 for processing multimedia information according to the embodiments of the present disclosure may perform the method for processing multimedia information provided in the method embodiments of the present disclosure, and an implementation principle thereof is similar to that described above, which will not be repeated here.

An apparatus for processing multimedia information is provided according to the embodiments of the present disclosure. Compared with the conventional technology, the solution according to the present disclosure realizes a direct processing on arbitrary multimedia segment of the to-be-processed multimedia information based on a trigger operation on the arbitrary multimedia segment, which does not require to process various multimedia segments in the to-be-processed multimedia information in a reverse order of the multimedia segments in the to-be-processed multimedia information, thereby reducing complexity, improving efficiency in multimedia information processing, and improving user experience.

The apparatus for processing the multimedia information according to the present disclosure is described above from the perspective of virtual modules or virtual units. An electronic device of the present disclosure is described below from the perspective of a physical device.

Hereinafter, reference is made to FIG. 3, which shows a schematic structural diagram of an electronic device 300 (such as a terminal device in a method embodiment) to which the embodiments of the present disclosure are applicable. The electronic device 300 includes: at least one processor and a memory. At least one application program stored in the memory. The application program is executable by the processor to perform the method for processing the multimedia information as described in the method embodiments.

Terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 3 is only exemplary, and should not indicate any limitation to the function and application scope of the embodiments of the present disclosure.

The electronic device includes a memory and a processor. The processor here may be referred to as a processing device 301, and the memory may include at least one of a Read-Only Memory (ROM) 302, a Random Access Memory (RAM) 303, or a storage device 308.

Figure 3:
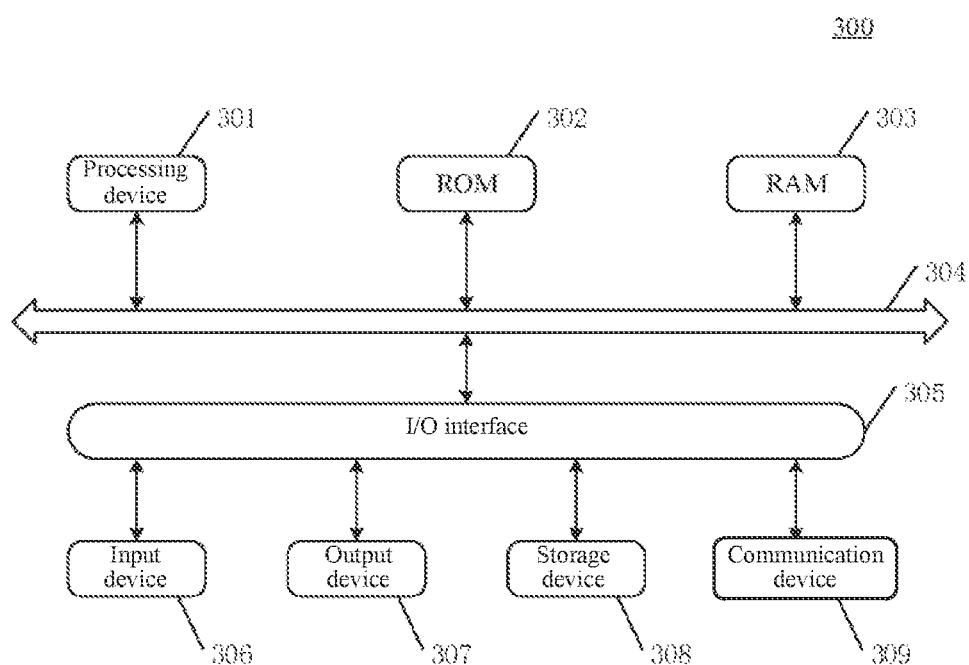
FIG. 3 is a schematic structural diagram of an electronic device according to an embodiment of the present disclosure.

As shown in FIG. 3, the electronic device 300 may include a processing device 301 (such as a central processing unit and a graphics processor) which may execute various operations and processing through a program stored in a Read-Only Memory (ROM) 302 or a program loaded from the storage device 9308 into a Random Access Memory (RAM) 303. The RAM 303 is further configured to store various programs and data required by the electronic device 300. The processing device 301, the ROM 302 and the RAM 303 are connected to each other through a bus 304. An Input/output (I/O) interface 305 is also connected to the bus 304.

Generally, the I/O interface 305 may be connected to: an input device 306, such as a touch screen, a touch panel, a keyboard, a mouse, a camera, a microphone, an accelerometer, and a gyroscope; an output device 307, such as a liquid crystal display (LCD), a speaker, and a vibrator; a storage device 308 such as a magnetic tape and a hard disk; and a communication device 309. The communication device 309 enables the electronic device 300 to perform wireless or wired communication with other devices for data exchanging. Although FIG. 3 shows an electronic device 300 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided in an embodiment in the present disclosure, including a computer program carried on a non-transitory computer readable medium. The computer program includes program codes for performing the method shown in the flow charts. In the embodiment, the computer program may be downloaded and installed from the network via the communication device 309, or installed from the storage device 308, or installed from the ROM 302. When the computer program is executed by the processing device 301, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof in the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium that can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client device and the server may perform communication using any currently known or future developed network protocol such as HTTP (Hyper'Text Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device.

The computer readable medium carries one or more programs. The one or more programs, when executed by the electronic device, cause the electronic device to: receive, from a user, a selection operation on an arbitrary multimedia segment in to-be-processed multimedia information, where the to-be-processed multimedia information includes at least two multimedia segments; determine a target multimedia segment, based on the selection operation; determine a processing mode, when a trigger operation on the target multimedia segment is received, and process the target multimedia segment, based on the determined processing mode.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer to (for example, via an Internet providing by an Internet service provider).

The flow charts and schematic diagrams in the drawings shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The modules or units mentioned in the description of the embodiments of the present disclosure may be implemented by means of software, or otherwise by means of hardware. In some circumstances, the name of a module or unit does not constitute a limitation on the module or unit itself. For example, a receiving module may also be described as "a module configured to receive, from a user, a selection operation on an arbitrary multimedia segment in to-be-processed multimedia information".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

An electronic device is provided according to an embodiment of the present disclosure. The electronic device includes: a memory and a processor. At least one application program is stored in the memory. The at least one application program, when executed by the processor, cause the processor to perform the method corresponding to relevant embodiments. With the embodiments of the present disclosure, a direct processing on the arbitrary multimedia segment of to-be-processed multimedia information based on a trigger operation on the arbitrary multimedia segment is realized, which does not require to process various multimedia segments in the to-be-processed multimedia information in a reverse order of the multimedia segments in the to-be-processed multimedia information, thereby reducing complexity, improving efficiency in multimedia information processing, and improving user experience.

The electronic device for processing the multimedia information according to the present disclosure is described above from the perspective of a physical device, and a computer-readable medium of the present disclosure is described below from the perspective of a medium.

A computer-readable medium is provided according to an embodiment of the present disclosure. A computer program is stored on the computer-readable medium. The computer program, when executed on the computer, causes the computer to perform the method corresponding to relevant embodiments to be performed. With the embodiments of the present disclosure, a direct processing on the arbitrary multimedia segment of to-be-processed multimedia information based on a trigger operation on the arbitrary multimedia segment is realized, which does not require to process various multimedia segments in the to-be-processed multimedia information in a reverse order of the multimedia segments in the to-be-processed multimedia information, thereby reducing complexity, improving efficiency in multimedia information processing, and improving user experience.

According to one or more embodiments of the present disclosure, a method for processing multimedia information is provided. The method includes:

receiving, from a user, a selection operation on an arbitrary multimedia segment in to-be-processed multimedia information, where the to-be-processed multimedia information includes at least two multimedia segments, and the arbitrary multimedia segment is not a last multimedia segment among the at least two multimedia segments;

determining a target multimedia segment, based on the selection operation:

determining a processing mode, when a trigger operation on the target multimedia segment is received; and processing the target multimedia segment, based on the determined processing mode.

According to one or more embodiments of the present disclosure, before the receiving, from a user, a selection operation on an arbitrary multimedia segment in to-be-processed multimedia information, the method further includes:

displaying identification information corresponding to the multimedia segments in the to-be-processed multimedia information.

The receiving, from a user, a selection operation on an arbitrary multimedia segment in to-be-processed multimedia information includes: receiving, from the user, a selection operation on identification information corresponding to the arbitrary multimedia segment.

According to one or more embodiments of the present disclosure, in a case that the determined processing mode is a deletion processing, the processing the target multimedia segment, based on the determined processing mode includes: deleting the target multimedia segment to obtain multimedia information after the deletion processing.

According to one or more embodiments of the present disclosure, after the deleting the target multimedia segment, the method further includes any one of:

capturing one or more multimedia segments, selecting at least one multimedia segment from the captured multimedia segments, and inserting the selected multimedia segment into the multimedia information after the deletion processing, where a position of the inserted multimedia segment with respect to multimedia segments in the multimedia information after the deletion processing is the same as a position of a deleted multimedia segment with respect to the multimedia segments in the multimedia information after the deletion processing; and restoring the deleted target multimedia segment to obtain multimedia information before the deletion processing.

According to one or more embodiments of the present disclosure, in a case that the determined processing mode is an insertion processing, the processing the target multimedia segment, based on the determined processing mode includes:

determining a to-be-inserted multi media information and an insertion position relative to the target multimedia segment; and inserting the to-be-inserted multimedia information at the insertion position relative to the target multimedia information segment.

According to one or more embodiments of the present disclosure, in a case that the determined processing mode is a clipping processing, the processing the target multimedia segment, based on the determined processing mode includes:

determining a to-be-clipped multimedia information from the target multimedia segment; and clipping out the to-be-clipped multimedia information.

According to one or more embodiments of the present disclosure, in a case that the determined processing mode includes at least one of an addition processing of a special effect or a change processing of a filter, and the target multimedia segment includes frames, the processing the target multimedia segment, based on the determined processing mode includes: determining at least one to-be-processed frame from the target multimedia segment; and performing at least one of the addition processing of the special effect and the change processing of the filter on the to-be-processed frame.

According to one or more embodiments of the present disclosure, in a case that the determined processing mode is a re-capturing processing, the processing the target multimedia segment, based on the determined processing mode includes: re-capturing at least one multimedia segment for the target multimedia segment.

According to one or more embodiments of the present disclosure, after the re-capturing at least one multimedia segment for the target multimedia segment, the method further includes:

determining, from the re-captured multimedia segment, at least one multimedia segment for replacing the target multimedia segment, based on the selection operation from the user; and replacing the target multimedia segment with the at least one determined multimedia segment.

According to one or more embodiments of the present disclosure, the method further includes at least one of:

controlling capturing or re-capturing to be stopped when it is detected that a duration of the captured or re-captured multimedia segment reaches a duration of the target multimedia segment; and controlling the capturing or re-capturing to be stopped when an operation for stopping the capturing or re-capturing triggered by the user is detected.

According to one or more embodiments of the present disclosure, the method further includes:

determining a to-be-clipped multimedia information from preset multimedia information; and clipping out the to-be-clipped multimedia information from the preset multimedia information.

The preset multimedia information includes at least one of the to-be-processed multimedia information, and multimedia information obtained by processing the target multimedia segment in the to-be-processed multimedia information.

According to one or more embodiments of the present disclosure, an apparatus for processing multimedia information is provided. The apparatus includes a receiving module, a first determining module, a second determining module, and a processing module.

The receiving module is configured to receive, from a user, a selection operation on an arbitrary multimedia segment in to-be-processed multimedia information, where the to-be-processed multimedia information includes at least two multimedia segments, and the arbitrary multimedia segment is not a last multimedia segment among the at least two multimedia segments.

The first determining module is configured to determine a target multimedia segment based on the selection operation.

The second determining module is configured to determine a processing mode, when a trigger operation on the target multimedia segment is received.

The processing module is configured to process the target multimedia segment, based on the determined processing mode.

According to one or more embodiments of the present disclosure, the apparatus further includes a display module.

The display module is configured to display identification information corresponding to respective multimedia segments in the to-be-processed multimedia information.

The receiving module is specifically configured to receive, from the user, a selection operation on identification information corresponding to the arbitrary multimedia segment.

According to one or more embodiments of the present disclosure, in a case that the determined processing mode is a deletion processing, the processing module includes a deleting unit.

The deleting unit is configured to delete the target multimedia segment to obtain multimedia information after the deletion processing.

According to one or more embodiments of the present disclosure, the device further includes any one of a capturing-selecting-inserting module or a restoring module.

The capturing-selecting-inserting module is configured to capture one or more multimedia segments, selecting at least one multimedia segment from the captured multimedia segments, and inserting the selected multimedia segment into the multimedia information after the deletion processing, where a position of the inserted multimedia segment with respect to multimedia segments in the multimedia information after the deletion processing is the same as a position of a deleted multimedia segment with respect to the multimedia segments in the multimedia information after the deletion processing.

The restoring module is configured to restore the deleted target multimedia segment to obtain multimedia information before the deletion processing.

According to one or more embodiments of the present disclosure, in a case that the determined processing mode is an insertion processing, the processing module includes a first determining unit and an inserting unit.

The first determining unit is configured to determine to-be-inserted multimedia information and an insertion position relative to the target multimedia segment.

The inserting unit is configured to insert the to-be-inserted multimedia information at the determined insertion position relative to the target multimedia segment.

According to one or more embodiments of the present disclosure, in a case that the determined processing mode is a clipping processing, the processing module includes a second determining unit and a clipping unit.

The second determining unit is configured to determine to-be-clipped multimedia information from the target multimedia segment.

The clipping unit is configured to clip out the determined to-be-clipped multimedia information.

According to one or more embodiments of the present disclosure, in a case that the determined processing mode includes at least one of an addition processing of a special effect and a change processing of a filter, and the target multimedia segment includes frames, the processing module includes a third determining unit and an adding-modifying unit.

The third determining unit is configured to determine at least one to-be-processed frame from the target multimedia segment.

The adding-modifying unit is configured to perform at least one of the addition processing of the special effect and the change processing of the filter on the to-be-processed frame.

According to one or more embodiments of the present disclosure, in a case that the determined processing mode is a re-capturing processing, the processing module includes a re-capturing unit.

The re-capturing unit is configured to re-capture at least one multimedia segment for the target multimedia segment.

According to one or more embodiments of the present disclosure, the apparatus further includes a third determining module and a replacing module.

The third determining module is configured to determine, from the re-captured multimedia segments, at least one multimedia segment for replacing the target multimedia segment, based on the selection operation from the user.

The replacing module is configured to replace the target multimedia segment with the at least one determined multimedia segment.

According to one or more embodiments of the present disclosure, the apparatus further includes at least one of a first control stop module or a second control stop module.

The first terminating module is configured to control capturing or re-capturing to be stopped when it is detected that a duration of the captured or re-captured multimedia segment reaches a duration of the target multimedia segment.

The second terminating module is configured to control the capturing or re-capturing to be stopped when an operation for stopping the capturing or re-capturing triggered by the user is detected.

According to one or more embodiments of the present disclosure, the apparatus further includes a fourth determining module and a clipping module.

The fourth determining module is configured to determine to-be-clipped multimedia information from preset multimedia information.

The clipping module is configured to clip out the to-be-clipped multimedia information from the preset multimedia information.

The preset multimedia information includes at least one of the to-be-processed multimedia information, and multimedia information obtained by processing the target multimedia segment in the to-be-processed multimedia information.

According to one or more embodiments of the present disclosure, an electronic device is provided. The electronic device includes: at least one processor and a memory. One or more application programs are stored in the memory. The application programs are executable by the processor for performing the method for processing the multimedia information.

According to one or more embodiments of the present disclosure, a computer-readable medium is provided. A computer program is stored on the computer-readable medium. The computer program, when executed by a processor, causes the processor to perform the method for processing the multimedia information.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims. For the apparatus according to the above embodiments, the manners in which modules of the apparatus perform operations have been described in detail in the method embodiments, and are not to be described in detail herein.

The invention claimed is:

1. A method for processing multimedia information, comprising:
    receiving, from a user, a selection operation on an arbitrary multimedia segment in to-be-processed multimedia information, wherein the to-be-processed multimedia information comprises at least two multimedia segments, and the arbitrary multimedia segment is not a last multimedia segment among the at least two multimedia segments;
    determining a target multimedia segment based on the selection operation;
    determining a processing mode, when a trigger operation on the target multimedia segment is received; and
    processing the target multimedia segment, based on the determined processing mode,
    wherein in a case that the determined processing mode is a re-capturing processing, the processing the target multimedia segment, based on the determined processing mode comprises:
    re-capturing a plurality of multimedia segments for the target multimedia segment;
    selecting, from the plurality of re-captured multimedia segments, at least one multimedia segment for replacing the target multimedia segment, based on the selection operation from the user; and
    replacing the target multimedia segment with the at least one multimedia segment.

2. The method according to claim 1, wherein before the receiving, from a user, a selection operation on an arbitrary multimedia segment in to-be-processed multimedia information, the method further comprises:
    displaying identification information corresponding to respective multimedia segments in the to-be-processed multimedia information, and
    the receiving, from a user, a selection operation on an arbitrary multimedia segment in to-be-processed multimedia information comprises:
    receiving, from the user, the selection operation on identification information corresponding to the arbitrary multimedia segment.

3. The method according to claim 1, wherein in a case that the determined processing mode is a deletion processing, the processing the target multimedia segment, based on the determined processing mode comprises:
    deleting the target multimedia segment, to obtain multimedia information after the deletion processing.

4. The method according to claim 3, wherein after the deleting the target multimedia segment, the method further comprises any one of:
    capturing one or more multimedia segments, selecting at least one multimedia segment from the captured multimedia segments, and inserting the selected multimedia segment into the multimedia information after the deletion processing, wherein a position of the inserted multimedia segment with respect to multimedia segments in the multimedia information after the deletion processing is the same as a position of a deleted multimedia segment with respect to the multimedia segments in the multimedia information after the deletion processing; and
    restoring the deleted target multimedia segment, to obtain multimedia information before the deletion processing.

5. The method according to claim 4, wherein the method further comprises at least one of:
    controlling capturing to be stopped when it is detected that a duration of the captured multimedia segment reaches a duration of the target multimedia segment; and
    controlling the capturing to be stopped when an operation for stopping the capturing triggered by the user is detected.

6. The method according to claim 1, wherein in a case that the determined processing mode is a clipping processing, the processing the target multimedia segment, based on the determined processing mode comprises:

determining to-be-clipped multimedia information from the target multimedia segment; and clipping out the determined to-be-clipped multimedia information.

7. The method according to claim 1, wherein in a case that the determined processing mode comprises at least one of an addition processing of a special effect and a change processing of a filter, and the target multimedia segment comprises frames, and the processing the target multimedia segment, based on the determined processing mode comprises:

determining at least one to-be-processed frame from the target multimedia segment; and performing at least one of the addition processing of the special effect and the change processing of the filter on the to-be-processed frame.

8. The method according to claim 1, wherein the method further comprises at least one of:

controlling re-capturing to be stopped when it is detected that a duration of the re-captured multimedia segment reaches a duration of the target multimedia segment; and controlling the re-capturing to be stopped when an operation for stopping the re-capturing triggered by the user is detected.

9. The method according claim 1, wherein the method further comprises:

determining to-be-clipped multimedia information from preset multimedia information; and clipping out the determined to-be-clipped multimedia information from the preset multimedia information, wherein the preset multimedia information comprises at least one of the to-be-processed multimedia information, and multimedia information obtained by processing the target multimedia segment in the to-be-processed multimedia information.

10. An apparatus for processing multimedia information, comprising:

at least one processor;

a memory; and at least one application program stored in the memory, wherein the application program, when executed by the processor, causes the processor to:

receive, from a user, a selection operation on an arbitrary multimedia segment in to-be-processed multimedia information, wherein the to-be-processed multimedia information comprises at least two multimedia segments, and the arbitrary multimedia segment is not a last multimedia segment among the at least two multimedia segments;

determine a target multimedia segment based on the selection operation;

determine a processing mode, when a trigger operation on the target multimedia segment is received; and process the target multimedia segment, based on the determined processing mode wherein in a case that the determined processing mode is an insertion processing, the application program, when executed by the processor, causes the processor to:

re-capture a plurality of multimedia segments for the target multimedia;

select, from the plurality of re-captured multimedia segments, at least one multimedia segment for replacing the target multimedia segment, based on the selection operation from the user; and replace the target multimedia segment with the at least one multimedia segment.

11. The apparatus according to claim 10, wherein the application program, when executed by the processor, causes the processor further to:

display identification information corresponding to respective multimedia segments in the to-be-processed multimedia information, and receive, from the user, the selection operation on identification information corresponding to the arbitrary multimedia segment.

12. The apparatus according to claim 10, wherein in a case that the determined processing mode is a deletion processing, the application program, when executed by the processor, causes the processor further to:

delete the target multimedia segment, to obtain multimedia information after the deletion processing.

13. The apparatus according to claim 12, wherein the application program, when executed by the processor, causes the processor to:

capture one or more multimedia segments, select at least one multimedia segment from the captured multimedia segments, and insert the selected multimedia segment into the multimedia information after the deletion processing, wherein a position of the inserted multimedia segment with respect to multimedia segments in the multimedia information after the deletion processing is the same as a position of a deleted multimedia segment with respect to the multimedia segments in the multimedia information after the deletion processing; or restore the deleted target multimedia segment, to obtain multimedia information before the deletion processing.

14. The apparatus according to claim 10, wherein in a case that the determined processing mode is a clipping processing, the application program, when executed by the processor, causes the processor to:

determine to-be-clipped multimedia information from the target multimedia segment; and clip out the determined to-be-clipped multimedia information.

15. The apparatus according to claim 10, wherein in a case that the determined processing mode comprises at least one of an addition processing of a special effect and a change processing of a filter, and the target multimedia segment comprises frames, and the application program, when executed by the processor, causes the processor to:

determine at least one to-be-processed frame from the target multimedia segment; and perform at least one of the addition processing of the special effect and the change processing of the filter on the to-be-processed frame.

16. The apparatus according to claim 10, wherein in a case that the determined processing mode is an insertion processing, the application program, when executed by the processor, causes the processor to:

determine to-be-inserted multimedia information and an insertion position relative to the target multimedia segment; and insert the to-be-inserted multimedia information at the insertion position relative to the target multimedia information segment.

17. A non-transitory computer-readable medium having a computer program stored thereon, wherein the computer program, when executed by a processor, causes the processor to perform a method for processing multimedia information, and the method comprises:

receiving, from a user, a selection operation on an arbitrary multimedia segment in to-be-processed multimedia information, wherein the to-be-processed multimedia information comprises at least two multimedia segments, and the arbitrary multimedia segment is not a last multimedia segment among the at least two multimedia segments;

determining a target multimedia segment based on the selection operation;

determining a processing mode, when a trigger operation on the target multimedia segment is received; and processing the target multimedia segment, based on the determined processing mode wherein in a case that the determined processing mode is a re-capturing processing, the processing the target multimedia segment, based on the determined processing mode comprises:

re-capturing a plurality of multimedia segments for the target multimedia segment;

select, from the plurality of re-captured multimedia segments, at least one multimedia segment for replacing the target multimedia segment, based on the selection operation from the user; and replacing the target multimedia segment with the at least one multimedia segment.

18. The method according to claim 1, wherein in a case that the determined processing mode is an insertion processing, the processing the target multimedia segment, based on the determined processing mode comprises:

determining to-be-inserted multimedia information and an insertion position relative to the target multimedia segment; and inserting the to-be-inserted multimedia information at the insertion position relative to the target multimedia information segment.

* * * * *